US008614981B2

(12) United States Patent
Mallik et al.

(10) Patent No.: US 8,614,981 B2
(45) Date of Patent: Dec. 24, 2013

(54) REPORTING OF CHANNEL INFORMATION TO SUPPORT COORDINATED MULTI-POINT DATA TRANSMISSION

(75) Inventors: Siddhartha Mallik, San Diego, CA (US); Taesang Yoo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 13/015,532

(22) Filed: Jan. 27, 2011

(65) Prior Publication Data

US 2011/0188393 A1 Aug. 4, 2011

Related U.S. Application Data

(60) Provisional application No. 61/299,876, filed on Jan. 29, 2010.

(51) Int. Cl.
*H04W 4/00* (2009.01)
*H04W 72/04* (2009.01)
*H04B 7/00* (2006.01)

(52) U.S. Cl.
USPC ........ 370/329; 370/252; 455/450; 455/452.1; 455/455; 455/456.1

(58) Field of Classification Search
USPC ........... 370/252, 253, 310–349; 455/450–526
See application file for complete search history.

(56) References Cited

U.S. PATENT DOCUMENTS

| 7,764,931 | B2 * | 7/2010 | Kim et al. | 455/69 |
| 2006/0223449 | A1 * | 10/2006 | Sampath et al. | 455/69 |
| 2009/0046647 | A1 * | 2/2009 | Roh et al. | 370/329 |
| 2010/0124181 | A1 * | 5/2010 | Hosein | 370/252 |
| 2010/0220675 | A1 * | 9/2010 | Chun et al. | 370/329 |
| 2010/0322171 | A1 * | 12/2010 | Dekorsy et al. | 370/329 |
| 2011/0103339 | A1 * | 5/2011 | Kim et al. | 370/329 |
| 2012/0002568 | A1 * | 1/2012 | Tiirola et al. | 370/252 |
| 2012/0106495 | A1 * | 5/2012 | Yang et al. | 370/329 |
| 2012/0218968 | A1 * | 8/2012 | Kim et al. | 370/329 |

OTHER PUBLICATIONS

3rd Generation Partnership Project; Technical Specification Group Radio Access Network; Evolved Universal Terrestrial Radio Access (E-UTRA); Physical layer procedures (Release 8), 3GPP Standard; 3GPP TS 36.213, 3rd Generation Partnership Project (3GPP), Mobile Competence Centre; 650, Route des Lucioles; F-06921 Sophia-Antipolis Cedex; France, no. V8.8.0, Sep. 1, 2009, pp. 1-81, XP050377563.

(Continued)

*Primary Examiner* — Afsar M Qureshi
(74) *Attorney, Agent, or Firm* — Steven A. Raney

(57) ABSTRACT

Techniques for reporting channel information are described. In one aspect, a plurality of channel information reporting modes are available to a user equipment (UE) for reporting channel information for coordinated multi-point (CoMP) data transmission. The UE may determine a first channel information reporting mode to use, determine first channel information related to at least one cell in a CoMP measurement set of the UE, and send the first channel information in accordance with the first channel information reporting mode to one or more cells in the CoMP measurement set. The UE may also determine a second channel information reporting mode to use, determine second channel information related to multiple cells in the CoMP measurement set, and send the second channel information in accordance with the second channel information reporting mode. A plurality of channel feedback configurations may be supported, including a single-stage, a two-stage, and/or a one-shot channel configurations.

62 Claims, 5 Drawing Sheets

(56) References Cited

OTHER PUBLICATIONS

International Search Report and Written Opinion—PCT/US2011/023053—ISA EPO—Aug. 11, 2011.
NTT DoCoMo: "Views on Scalable CSI Feedback for DL CoMP in LTE-Advanced" 3GPP Draft; R1-094243 CSI Feedback for DL CoMP, 3rd Generation Partnership Project (3GPP), Mobile Competence Centre; 650, Route 'des Lucioles. F-06921 Sophia-Antipolis Cedex; France, no. Miyazaki; Oct. 12, 2009, XP050388707, p. 1-p. 3; figures 2,3; table 1.
Qualcomm Europe: "TP for feedback in support o f DL CoMP for LTE-A TR" 3GPP Draft; R1-092284 TP for TR 36.814 on DL CoMP Feedback, 3rd Generation Partnership Project (3GPP), Mobile Competence Centre; 650, Route des Lucioles; F-06921 Sophia-Antipolis Cedex-France, no. San Francisco, USA; May 9, 2009, XP050339694, p. 1-p. 2.
Alcatel-Lucent Shanghai Bell et al: "Feedback overhead for DL CoMP", 3GPP Draft; R1-100720, 3rd Generation Partnership Project (3GPP), Mobile Competence Centre; 650, Route Des Lucioles; F-06921 Sophia-Antipolis Cedex; France, vol. RAN WG1, no. Valencia, Spain; Jan. 18, 2010, Jan. 13, 2010, XP050418343, [retrieved on Jan. 13, 2010] * pp. 1-2, 5-7 *.
CMCC: "Views on the relationship among CoMP sets", 3GPP Draft; R1-092822 Views on the Relationship Among CoMP Sets, 3rd Generation Partnership Project (3GPP), Mobile Competence Centre; 650, Route des Lucioles; F-06921 Sophia-Antipolis Cedex; France, vol. RAN WG1, no. Los Angeles; 20090629-20090703, Jun. 24, 2009, XP050597550, [retrieved on Jun. 24, 2009] * p. 6-p. 7 *.
European Search Report—EP1317822—Search Authority—Munich—Oct. 15, 2013.
European Search Report—EP13178224—Search Authority—Munich—Oct. 18, 2013.
Fujitsu: "Discussion on Some Aspects of Signalling for CoMP Operation", 3GPP Draft; R2-095908—Discussion on Some Aspects of Signalling for CoMP Operation, 3rd Generation Partnership Project (3GPP), Mobile Competence Centre; 650, Routes des Lucioles; F-06921 Sophia-Antipolis Cedex; France, no. Miyazaki; Oct. 12, 2009, XP050390359, [retrieved on Oct. 12, 2009] * p. 3-p. 4 *.
Panasonic: "Discussion on Combined/Non-Combined CoMP Reporting", 3GPP Draft; R1-092528, 3rd Generation Partnership Project (3GPP), Mobile Competence Centre; 650, Route des Lucioles; F-06921 Sophia-Antipolis Cedex; France, no. Los Angeles, USA; Jun. 23, 2009, XP050351033, [retrieved on Jun. 23, 2009].
QUALCOMM Europe: "Feedback in support of Downlink CoMP: General views", 3GPP Draft; R1-094217 Feedback in Support of DL CoMP, 3rd Generation Partnership Project (3GPP), Mobile Competence Centre; 650, Route des Lucioles; F-06921 Sophia-Antipolis Cedex; France, no. Miyazaki; Oct. 12, 2009, XP050388686, [retrieved on Oct. 12, 2009] Section 3, Encoding of time-frequency selective feedback and Conclusion section.
Qualcomm Europe: "Hierarchical feedback in support of downlink CoMP operation", 3GPP Draft; R1-093110 Hierarchical Feedback in Support of DL CoMP Operation, 3rd Generation Partnership Project (3GPP). Mobile Competence Centre; 650, Route des Lucioles; F-06921 Sophia-Antipolis Cedex ; France, no. Shenzhen, China; Aug. 24, 2009, XP050388098, [retrieved on Aug. 24, 2009] A* pp. 1-3.
Qualcomm Europe: "Impact of Downlink CoMP on the Air Interface" 3GPP Draft; R1-090366, 3rd Generation Partnership Project (3GPP), Mobile Competence Centre; 650, Route des Lucioles; F-06921 Sophia-Antipolis Cedex; France, no. Ljubljana; Jan. 8, 2009, XP050318270.

* cited by examiner

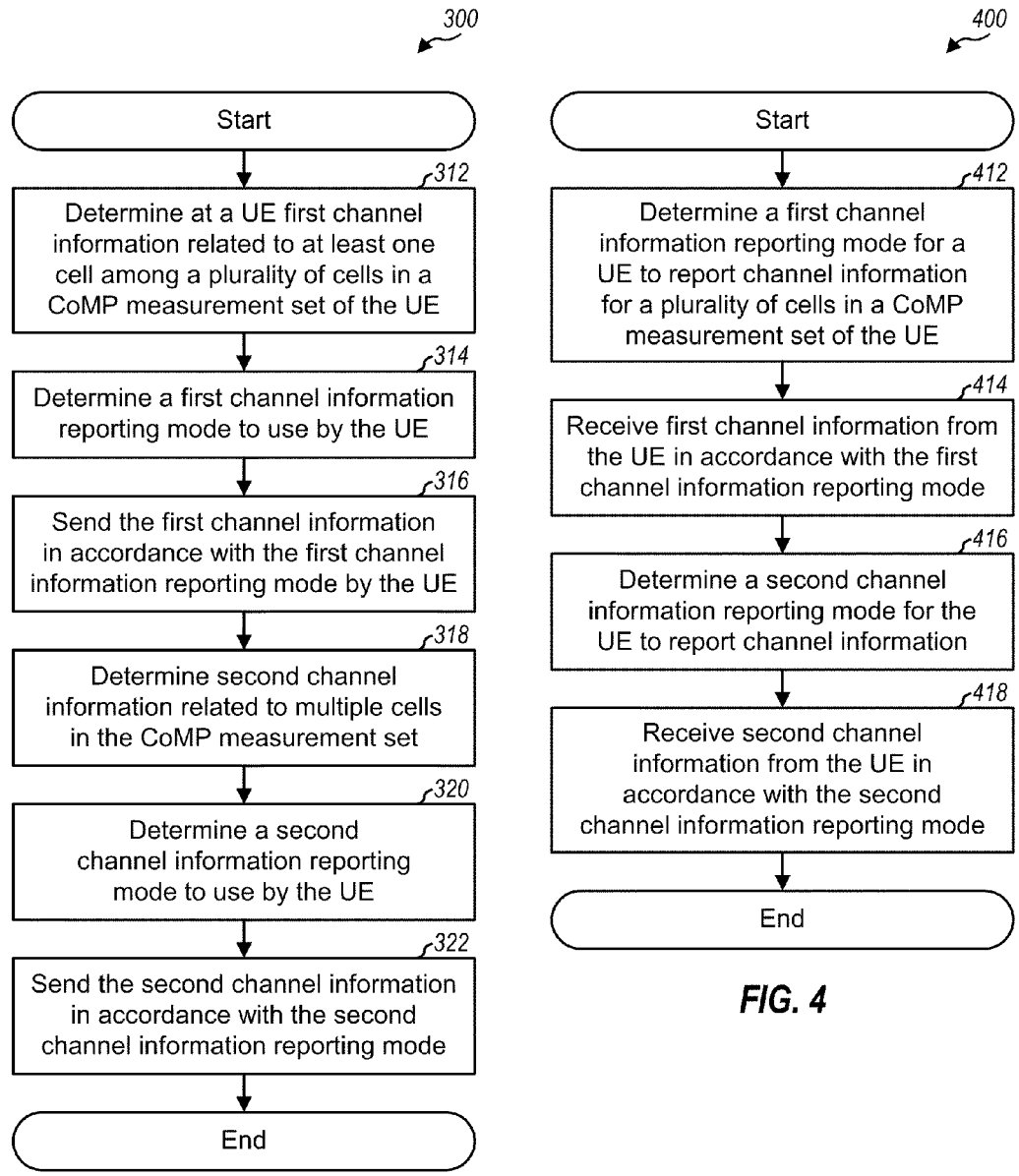

REPORTING OF CHANNEL INFORMATION TO SUPPORT COORDINATED MULTI-POINT DATA TRANSMISSION

The present application claims priority to U.S. Provisional Application No. 61/299,876, entitled "USER EQUIPMENT FEEDBACK TO SUPPORT COORDINATED MULTI-POINT OPERATION," filed Jan. 29, 2010, assigned to the assignee hereof and incorporated herein by reference.

BACKGROUND

I. Field

The present disclosure relates generally to communication, and more specifically to techniques for supporting data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of cells that can support communication for a number of user equipments (UEs). The term "cell" can refer to a coverage area of a base station and/or a base station subsystem serving the coverage area, depending on the context in which the term is used. A UE may be within the coverage of multiple cells. One or more of the multiple cells may be selected to serve the UE. It may be desirable for the UE to report channel information so that the selected cell(s) can transmit data to the UE in a manner that can provide good performance.

SUMMARY

Techniques for reporting channel information in support of a coordinated multi-point (CoMP) data transmission are described herein. A UE may have a CoMP measurement set comprising a plurality of cells which can coordinate to transmit data to the UE. The UE may report channel information for the cells in the CoMP measurement set in order to support CoMP data transmission to the UE.

In one aspect, a plurality of channel information reporting modes may be available for reporting channel information for CoMP data transmission. The plurality of channel information reporting modes may include (i) a channel information reporting mode for reporting channel information for a single subband for multiple cells, (ii) a channel information reporting mode for reporting channel information for multiple subbands for a single cell, (iii) a channel information reporting mode for reporting channel information for multiple subbands for multiple cells, and/or (iv) other channel information reporting modes.

In one aspect, the UE may determine a first channel information reporting mode for use by the UE from among the plurality of channel information reporting modes. The UE may determine first channel information related to at least one cell in its CoMP measurement set. The first channel information may include various types of information, as described herein. The UE may send the first channel information in accordance with the first channel information reporting mode to one or more cells in the CoMP measurement set. The UE may also determine a second channel information reporting mode to use by the UE, which may be another one of the plurality of channel information reporting modes. The UE may determine second channel information related to multiple cells in the CoMP measurement set and may send the second channel information in accordance with the second channel information reporting mode to the one or more cells.

In another aspect, a plurality of channel feedback configurations may be supported and may include a single-stage, a two-stage, and/or a one-shot channel feedback configuration. In the single-stage channel feedback configuration, the UE may send channel information for a subset of the cells in its CoMP measurement set in each reporting interval and may cycle through the cells in the CoMP measurement set in different reporting intervals. In the two-stage channel feedback configuration, the UE may send channel information (i) for a subset of the cells in its CoMP measurement set prior to being selected for CoMP data transmission and (ii) for all cells in its CoMP measurement set after being selected for CoMP data transmission. In the one-shot channel feedback configuration, the UE may send channel information for all cells in its CoMP measurement set in one report.

A cell may receive channel information reported by the UE and may participate in CoMP data transmission to the UE. Various aspects and features of the disclosure are described in further detail below.

BRIEF DESCRIPTION OF THE DRAWINGS

FIG. 3 shows a process for reporting channel information by a UE.

FIG. 4 shows a process for receiving channel information by a cell.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
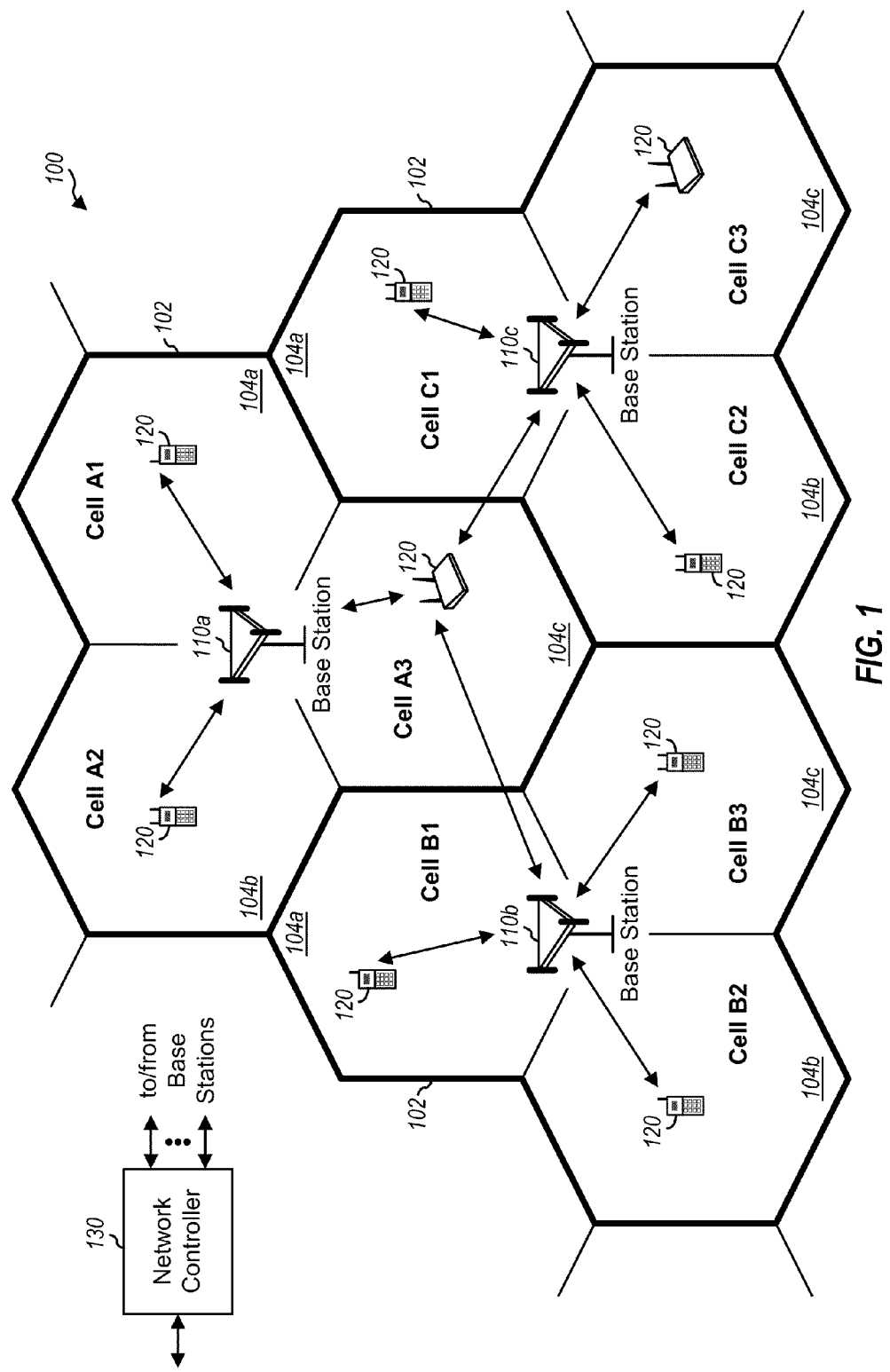
FIG. 1 shows a wireless communication network.

FIG. 1 shows a wireless communication network 100, which may be an LTE network or some other wireless network. Wireless network 100 may include a number of base stations and other network entities. For simplicity, only three base stations 110a, 110b and 110c and one network controller 130 are shown in FIG. 1. A base station may be an entity that communicates with UEs 120 and may also be referred to as a Node B, an evolved Node B (eNB), an access point, etc. Each base station 110 may provide communication coverage for a particular geographic area 102. To improve network capacity, the overall coverage area of a base station may be partitioned into multiple smaller areas, e.g., three smaller areas 104a, 104b and 104c. Each smaller area may be served by a respective base station subsystem. In 3GPP, the term "cell" can refer to the smallest coverage area of a base station and/or a base station subsystem serving this coverage area. In 3GPP2, the term "sector" or "cell-sector" can refer to the smallest coverage area of a base station and/or a base station subsystem serving this coverage area. For clarity, 3GPP concept of cell is used in the description below. In general, a base station may support one or multiple (e.g., three) cells.

Network controller 130 may couple to a set of base stations and may provide coordination and control for these base stations. Network controller 130 may include a Mobility Management Entity (MME) and/or some other network entity.

UEs 120 may be dispersed throughout the wireless network, and each UE may be stationary or mobile. For simplicity, FIG. 1 shows only one UE 120 in each cell. In general, any number of UEs may be present in each cell. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A UE may communicate with a base station via the downlink and uplink. The downlink (or forward link) refers to the communication link from the base station to the UE, and the uplink (or reverse link) refers to the communication link from the UE to the base station.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

A number of subbands may be defined, and each subband may include a number of subcarriers. In one design, each subband may include 96 contiguous subcarriers and may cover 1.44 MHz. The number of subbands may be dependent on the system bandwidth and may range from 1 to 13 for system bandwidth of 1.25 to 20 MHz. In other designs, each subband may include more or fewer subcarriers. In general, the subbands may have the same size or different sizes. The number of subbands and the size of each subband may be fixed or configurable and may be dependent on the system bandwidth. A subband may also be referred to as a bandwidth part, a frequency, etc.

Wireless network 100 may support coordinated multi-point (CoMP) data transmission, which may also be referred to as downlink network multiple-input multiple-output (MIMO). For CoMP data transmission, multiple cells may coordinate to transmit data to one or more UEs on the same time-frequency resource such that signals from the multiple cells can be combined at a target UE and/or inter-cell interference can be reduced at an interfered UE. CoMP data transmission may include the following:

1. Joint processing—multi-point transmission of data from multiple cells to one or more UEs with precoding vectors at different cells being selected to achieve beamforming gain at a target UE and/or interference reduction at one or more interfered UEs, and
2. Coordinated beamforming—single-point transmission of data from a single cell to a target UE with one or more precoding vectors selected for the cell by trading between beamforming gain to the target UE and interference reduction to one or more interfered UEs served by one or more neighbor cells.

Multiple cells may transmit data to a given UE for joint processing whereas a single cell may transmit data to the UE for coordinated beamforming. For both joint processing and coordinated beamforming, the precoding vector(s) used by one or more cells to transmit data to the UE may be selected by considering the channels of the UE as well as the channels of other UE(s) in order to reduce inter-cell interference.

Figure 2:
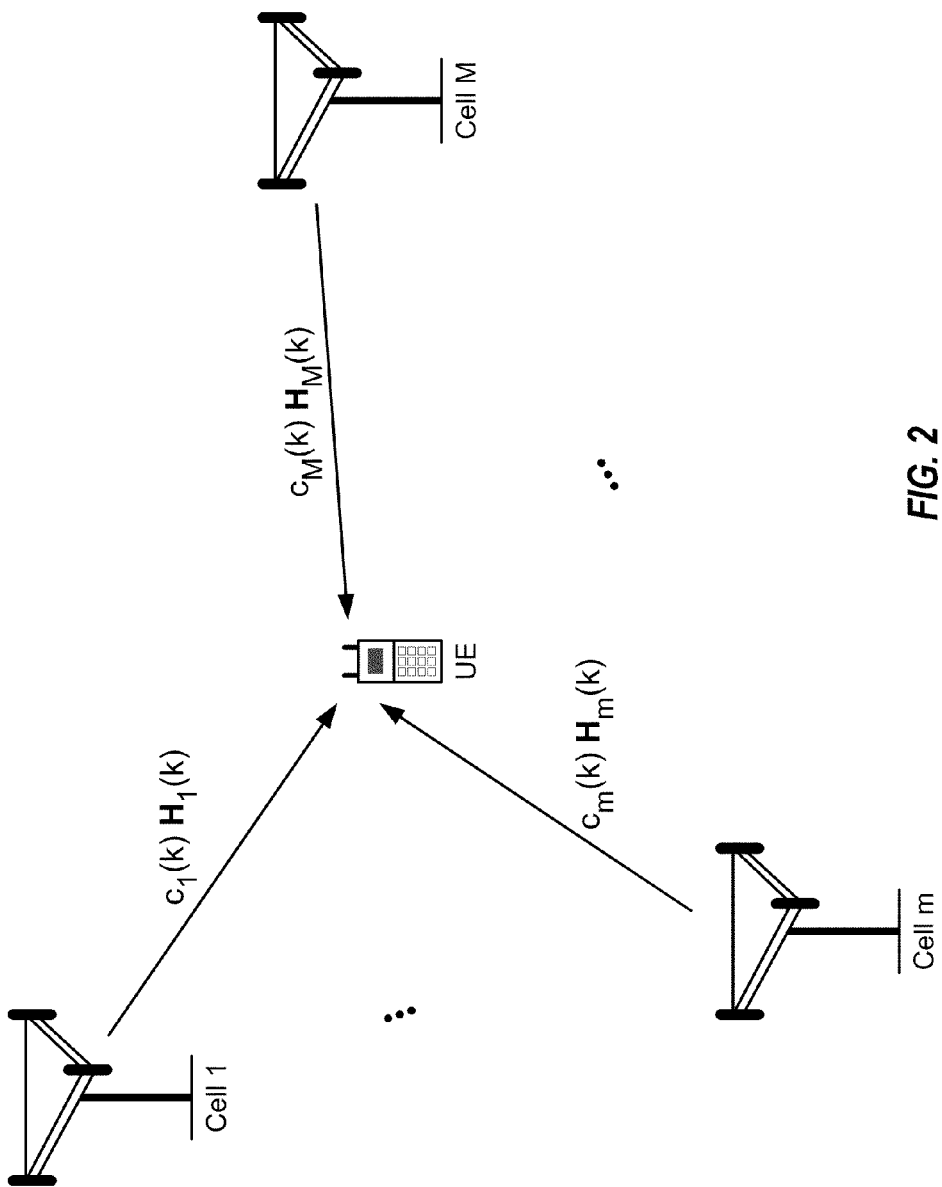
FIG. 2 shows an example of CoMP data transmission to a UE.

FIG. 2 shows an example of CoMP data transmission from multiple cells to a single UE. The UE may have a CoMP measurement set, which may include all cells that can be measured by the UE and can participate in CoMP data transmission to the UE. These cells may belong to the same base station or different base stations and may be selected based on channel gain/pathloss, received signal strength, received signal quality, etc. Received signal quality may be quantified by a signal-to-noise-and-interference ratio (SINR), a carrier-to-interference ratio (C/I), etc. For example, the CoMP measurement set may include cells with channel gain or SINR above a threshold. The UE may determine and report channel information for the cells in the CoMP measurement set. The UE may be served by one or more cells in the CoMP measurement set for either multi-point transmission (joint processing) or single-point transmission (coordinated beamforming). The one or more cells serving the UE may include some or all of the cells in the CoMP measurement set and may be dynamically selected without the UE's knowledge.

As shown in FIG. 2, the UE may have a different channel or link for each cell. The response of the channel from each cell m to the UE may be given as $c_m(k) H_m(k)$, where $H_m(k)$ is a $R \times T_m$ channel matrix for cell m on subband k, $c_m(k)$ is a long-term channel gain for cell m on subband k, $T_m$ is the number of transmit antennas at cell m, R is the number of receive antennas at the UE, $m \in \{1, \ldots, M\}$ is a cell index, M is the number of cells in the CoMP measurement set of the UE, and k is a subband index. M may also be referred to as a CoMP measurement set size (CMSS). $H_m(k)$ includes channel gains that represent the short-term fading between the $T_m$ transmit antennas at cell m and the R receive antennas at the UE on subband k, where in general $T_m \geq 1$ and $R \geq 1$. $c_m(k)$ represents the long-term channel gain between cell m and the UE on subband k. There may be non-negligible differences between (i) the long-term channel gains of different cells in the CoMP measurement set and (ii) the long-term channel gains of different subbands for the same cell. The channel matrices for all M cells in the CoMP measurement set for each subband may be expressed as:

$$H(k)=[H_1(k),H_2(k),\ldots,H_M(k)],\quad\text{Eq (1)}$$

where H(k) is a R×T$_{total}$ overall channel matrix for subband k, and $$T_{total} = \sum_m T_m$$

is the total number of transmit antennas at the M cells.

Each cell may transmit a cell-specific reference signal (CRS) that may be used by the UE for channel estimation. A reference signal is a signal that is known a priori by a transmitter and a receiver and may also be referred to as pilot. A CRS is a reference signal that is specific for a cell, e.g., generated based on a cell identity (ID). The UE may estimate the channel response (e.g., a channel matrix) for each cell on each subband of interest based on the CRS from that cell.

The UE may send channel information to support CoMP data transmission. In one design, the channel information may comprise hierarchical eigen-feedback information, which may include one or more eigenvectors for one or more eigenmodes of the channel from each cell to the UE. The UE may measure the channel matrix H$_m$(k) for each cell m on each subband k of interest and may obtain a measured channel matrix. For simplicity, the description herein assumes no channel estimation error, and the measured channel matrix is equal to the actual channel matrix.

In a first design of hierarchical eigen-feedback, the UE may perform singular value decomposition of the measured channel matrix for a designated cell, which may be a serving cell of the UE, or a strongest cell received by the UE, or some other cell. The singular value decomposition may be expressed as:

$$H_1(k)=U_1(k)\Sigma_1(k)V_1^H(k),\quad\text{Eq (2)}$$

where U$_1$(k) is a unitary matrix of left singular vectors of H$_1$(k),
V$_1$(k) is a unitary matrix of right singular vectors of H$_1$(k), and
Σ$_1$(k) is a diagonal matrix of singular values of H$_1$(k).

The UE may determine an equivalent channel matrix for each cell m on each subband of interest as follows:

$$G_m(k)=U_1^H(k)H_m(k),\quad\text{Eq (3)}$$

where G$_m$(k) is an equivalent channel matrix for cell m on subband k.

The UE may quantize N best vectors in each equivalent channel matrix based on a codebook C$_P$. In one design, the UE may evaluate the performance of different possible number of channel vectors (i.e., different possible N values) and may select the N value with the best performance. In another design, the UE may be configured with a specific value of N based on various criteria such as long-term channel conditions, the amount of data for the UE, etc. In any case, N may be referred to as a maximum "rank" and may be indicative of the maximum number of layers or eigenmodes available for data transmission to the UE.

The UE may quantize the equivalent channel matrix G$_m$(k) for each cell on each subband of interest as follows. The equivalent channel matrix G$_m$(k) includes N rows corresponding to the N best equivalent channel vectors g$_{1,m}$(k) through g$_{N,m}$(k). A per-cell codebook C$_P$ may be used to quantize each equivalent channel vector and may include a number of (S) channel vectors. Each channel vector in the codebook C$_P$ may be assigned a unique B-bit index, where B=⌈log$_2$(S)⌉. The UE may quantize each equivalent channel vector based on the codebook C$_P$ as follows:

$$d_{n,m}(k) = \arg\max_{d:d\in C_p} \langle d, g_{n,m}(k)\rangle,\quad\text{Eq (4)}$$

where d is a channel vector in the codebook C$_P$,
g$_{n,m}$(k) is an equivalent channel vector corresponding to the n-th row of G$_m$(k),
⟨ , ⟩ is a metric such as a normalized correlation $$\langle d, g_{n,m}(k)\rangle = \frac{|d^H g_{n,m}(k)|}{\|d\|\|g_{n,m}(k)\|},$$

d$_{n,m}$(k) is a quantized channel vector for g$_{n,m}$(k), and
"H" denotes a Hermetian or conjugate transpose.

As shown in equation (4), the equivalent channel vector g$_{n,m}$(k) may be evaluated against each channel vector in the codebook C$_P$. The channel vector in the codebook C$_P$ with the best metric may be selected as the quantized channel vector d$_{n,m}$(k) for the equivalent channel vector g$_{n,m}$(k).

A channel vector, such as an equivalent channel vector g$_{n,m}$(k), may comprise (i) a channel direction indicative of the direction of a spatial beam and (ii) a magnitude indicative of the strength of the spatial beam. The channel vectors in the codebook C$_P$ may be defined to have unit norm (or a magnitude of 1) so that ||d||=1 for each channel vector in the codebook. In this case, the quantized channel vector d$_{n,m}$(k) would include a channel direction but not a magnitude. Furthermore, if normalized correlation is used to determine the quantized channel vector, then the quantized channel vector would not include phase information.

In one design, the UE may determine a channel gain for each equivalent channel vector as follows:

$$\alpha_{n,m}(k)=\text{Quantized}\|g_{n,m}(k)\|,\quad\text{Eq (5)}$$

where α$_{n,m}$(k) is a channel gain corresponding to a quantized magnitude of g$_{n,m}$(k).

In another design, the UE may normalize the channel norm ||g$_{n,m}$(k)|| of each equivalent channel vector based on the trace of a covariance matrix R(k) of residual interference at the UE. The UE may estimate the residual interference based on the sum of long-term received powers of all cells except for the cells in the CoMP measurement set of the UE.

In one design, the UE may determine relative amplitude and phase information for the M cells in the CoMP measurement set. An inter-cell codebook C$_θ$ may be used to quantize the relative amplitude and phase for the M cells and may include a number of relative amplitude and phase vectors. Each relative amplitude and phase vector in the codebook C$_θ$ may be assigned a unique index. The UE may determine the relative amplitude and phase of the M equivalent channel vectors for the M cells for each layer, as follows:

$$z_n(k) = \arg\max_{z:z\in C_\theta}\langle z\circ d_n(k), g_n(k)\rangle,\quad\text{Eq (6)}$$

where g$_n$(k)=[g$_{n,1}$(k), . . . , g$_{n,M}$(k)] is an extended equivalent channel vector for layer n,
d$_n$(k)=[α$_{n,1}$ d$_{n,1}$(k), . . . , α$_{n,M}$ d$_{n,M}$(k)] is an extended quantized channel vector for layer n, $z = [z_1, \ldots, z_M]$ is a vector with M relative complex gains for the M cells, $z \circ d_n(k) = [z_1 \alpha_{n,1} d_{n,1}(k), \ldots, z_M \alpha_{n,M} d_{n,M}(k)]$, and $z_n(k)$ is a relative amplitude and phase vector for layer n.

As shown in equation (6), the equivalent channel vectors for layer n in the extended vector $g_n(k)$ may be evaluated against the corresponding quantized channel vectors in the extended vector $d_n(k)$ for each possible relative amplitude and phase vector z in the codebook $C_\theta$. Each vector z includes M complex gains for the M cells, which are indicative of the relative amplitude and phase between the M cells. The relative amplitude and phase vector in the codebook $C_\theta$ with the best metric may be selected as a quantized relative amplitude and phase vector for the M cells for layer n. The process may be repeated for each of the N layers to obtain N quantized relative amplitude and phase vectors $z_1(k)$ through $z_N(k)$ for the N layers.

The UE may report channel information comprising channel direction information (CDI) and channel magnitude information (CMI) for all layers, cells, and subbands of interest. The CDI may be indicative of the channel direction of channel vectors for all layers, cells, and subbands of interest and may comprise the indices of the quantized channel vectors $d_{n,m}(k)$ for all layers, cells, and subbands of interest. The CMI may be indicative of the magnitude of the channel vectors for all layers, cells, and subbands of interest and may comprise the indices of the channel gains $\alpha_{n,m}(k)$ for all layers, cells, and subbands of interest. The channel information may further comprise relative amplitude and phase information, which may comprise the indices of the quantized relative amplitude and phase vectors $z_n(k)$ for all layers of interest. The channel information may also comprise other information.

The first hierarchical eigen-feedback design may provide certain advantages. First, the unitary matrix $U_1(k)$ is determined based on the channel matrix $H_1(k)$ for the designated cell (e.g., the serving cell) and hence may not change when the CoMP measurement set changes. Second, the unitary matrix $U_1(k)$ may be a good approximation of a good receive beam for the UE since the designated cell is likely to be one of the strongest cells received by the UE.

In a second design of hierarchical eigen-feedback, the UE may normalize the channel matrices, as follows:

$$W_m(k) = R^{-1/2}(k) H_m(k), \quad \text{Eq (7)}$$

where $W_m(k)$ is a whitened channel matrix for cell m on subband k.

The UE may process the whitened channel matrices (instead of the measured channel matrices) as described above for the first hierarchical eigen-feedback design. The second design can normalize the CMI.

In a third design of hierarchical eigen-feedback, the UE may perform singular value decomposition of the measured channel matrix $H_m(k)$ for each cell to obtain a matrix $U_m(k)$ of eigenvectors and a diagonal matrix $\Sigma_m(k)$, e.g., as shown in equation (2). The UE may then quantize each eigenvector of interest in $U_m(k)$ based on the codebook $C_P$, e.g., as shown in equation (4). The UE may also quantize each singular value of interest in $\Sigma_m(k)$, e.g., as shown in equation (5). The UE may also determine relative amplitude and phase vectors for the M cells in the CoMP measurement set based on the measured eigenvectors for the M cells and the quantized eigenvectors for the M cells, e.g., as shown in equation (6).

In a fourth design of hierarchical eigen-feedback, the channel information may comprise channel vector information. This design may be equivalent to the first design with the unitary matrix $U_1(k)$ being equal to an identity matrix. The UE may quantize each measured channel vector of interest based on the codebook $C_P$, e.g., as shown in equation (4). The UE may also quantize each channel norm of interest, e.g., as shown in equation (5). The UE may also determine relative amplitude and phase vectors for the M cells in the CoMP measurement set based on the measured channel vectors for the M cells and the quantized channel vectors for the M cells, e.g., as shown in equation (6).

The UE may also determine channel information for the cells in the CoMP measurement set in other manners. In general, the UE may determine a receive beam for each MIMO stream in various manners. For example, the receive beam may be based on receive eigen-modes matched to a designated cell (e.g., the serving cell), as described above for the first hierarchical eigen-feedback design. The receive beam may result in an equivalent multiple-input single-output (MISO) channel between the cells and the UE. The resulting MISO channel from multiple cells and/or transmit antennas to the UE may be decomposed into per-cell components comprising quantized channel vectors and quantized channel norms. For joint processing, the per-cell components may be augmented with inter-cell components comprising the relative amplitude and phase vectors.

The UE may send a large amount of channel information. For example, the UE may send 8 to 12 bits for CDI for one quantized channel vector (e.g., for four transmit antennas) and 3 to 4 bits for CMI for one quantized channel vector. The UE may thus send a total of 11 to 16 bits for CDI and CMI for each layer on each subband for each cell in the CoMP measurement set. The large feedback payloads may be illustrated by following two scenarios. In a first scenario, the UE may be served by a femto cell and may be interfered by two neighbor femto cells in a wireless network with 10 MHz system bandwidth. The CoMP measurement set of the UE may include the serving cell and the two neighbor cells. The UE may support rank 2 transmission and may report CDI and CMI for each subband of 2.5 MHz. A channel information report may include 10-bit CDI and 3-bit CMI for each of two layers on each of four subbands for each of three cells. The total payload for one channel information report may then include approximately $(10+3)*(4+4+4)*2 \approx 325$ bits.

In a second scenario, the UE may be served by a femto cell and may be interfered by one femto cell and one macro cell in a 10 MHz wireless network. The UE may support rank 2 transmission and may report CDI and CMI for each subband of 2.5 MHz for each femto cell and for each subband of 1 MHz for the macro cell, e.g., due to more frequency selectivity for the macro cell. The total payload for one channel information report may then include approximately $(10+3)*(4+4+10)*2 \approx 500$ bits. It may be difficult to send large channel information reports.

In an aspect, a number of channel feedback configurations may be supported. Each channel feedback configuration may allow the UE to report a subset of all channel information for the cells in the CoMP measurement set in each channel information report. This may reduce the amount of channel information to send in each report.

In one design, two channel feedback configurations may be supported as follows:

Single-stage channel feedback configuration—the UE sends all channel information for each cell when the cell is reported, and Two-stage channel feedback configuration—the UE sends channel information for cells in two stages.

For the single-stage channel feedback configuration, the UE may send channel information for all layers of all subbands for one or more cells in the CoMP measurement set in a channel information report. The size of the report may then be dependent on the number of cells to report, the number of subbands and layers to report for each cell, and the sizes of CDI and CMI for one layer on one subband for one cell. In one design, the UE may cycle through the cells in the CoMP measurement set. In another design, the UE may report channel information for certain cells in the CoMP measurement set more often than other cells. For example, the UE may report channel information for the serving cell and stronger cells more frequently than weaker cells.

For the two-stage channel feedback configuration, the UE may send channel information in two stages, as follow:
1. Stage 1—send coarse channel information to enable tentative selection of UEs for data transmission, and
2. Stage 2—send accurate channel information to enable computation of precoding vectors to use for CoMP data transmission to the UE.

In one design, all UEs that can be scheduled for CoMP data transmission may report coarse channel information in stage 1. The coarse channel information from all UEs may be used to tentatively select one or more UEs for CoMP data transmission, i.e., to make a tentative scheduling decision at the serving cell. In one design, only UEs tentatively selected for CoMP data transmission may report accurate channel information in stage 2. A UE tentatively selected for CoMP data transmission may or may not actually be scheduled for CoMP data transmission. The accurate channel information from the scheduled UEs may be used to compute precoding vectors for these UEs.

In general, the coarse channel information may include any information that may be useful for tentative selection of UEs for CoMP data transmission. In one design, the coarse channel information may include information for only the serving cell. In another design, the coarse channel information may include information for one cell (or a few cells) in each report, and the UE may cycle through the cells in the CoMP measurement set. The coarse channel information may include information for one layer on one subband for each cell being reported. Alternatively, the coarse channel information may include information for multiple layers on one subband, or one layer on multiple subbands, or multiple layers on multiple subbands for each cell being reported. In yet another design, the UE may periodically send coarse channel information comprising CDI and CMI for one layer on one subband for one cell (e.g., in a 11-bit report). The UE may cycle through different layers and/or different subbands for only the serving cell or for each cell to report coarse channel information.

In general, the accurate channel information may include any information that may be useful for computation of precoding vectors for CoMP data transmission to the UE. In one design, the accurate channel information may include CDI and CMI for all layers on all subbands for all cells of interest. The UE may report accurate channel information for different cells in the CoMP measurement set at the same rate or different rates. For example, the UE may report accurate channel information for the serving cell and stronger cells more frequently and for weaker cells less frequently. The UE may report accurate channel information for the same or different number of layers (or rank) and for the same or different number of subbands for different cells. For example, an interfering cell may have a different rank than the serving cell. As another example, a weaker cell may be reported with lower frequency granularity than the serving cell.

In one design, a channel information report for the single-stage channel feedback configuration or for stage 2 of the two-stage channel feedback configuration may include one or more of the fields shown in Table 1.

TABLE 1

Channel Information Report

| Field | Size | Description |
| --- | --- | --- |
| Cell Index | 2-3 bits | Indicate which cell is being reported. |
| Layer Index | 1 bit | Indicate which layer is being reported. |
| Subband Index | 1-4 bits | Indicate which subband is being reported. |
| CDI | 8-12 bits | Include CDI or channel direction for the layer, subband, and cell being reported. |
| CMI | 2-4 bits | Include CMI or channel gain for the layer, subband, and cell being reported. |
| RQI | 4-6 bits | Include resource quality indicator (RQI) for the layer and subband being reported. |

In one design, the number of layers and the number of subbands to report may be defined for each cell in the CoMP measurement set. The size of the layer index and the size of the subband index for each cell may then be dependent on the number of layers and the number of subbands defined for that cell. In another design, the number of layers and the number of subbands to report may be the same for all cells in the CoMP measurement set.

The CDI for a layer on a subband for a cell may be selected from a codebook of a suitable size. In one design, the CDI may comprise 8-12 bits for a code block flag (CBF) with four transmit antennas and no feedback compression. The CMI for a layer on a subband for a cell may be quantize to a suitable number of bits, e.g., 2-4 bits. In one design, the CMI may comprise an absolute value determined based on a channel norm, e.g., as shown in equation (5). In another design, the CMI may comprise a delta value (i.e., a differentially encoded value) determined with respect to a reference CMI. The reference CMI may be a wideband CMI, a CMI for the first/best layer for the serving cell, etc. The RQI may be indicative of received signal quality for a specific resource as measured at the UE. The RQI may or may not be included in a channel information report.

A channel information report may also include other information instead of or in addition to the information shown in Table 1. For example, a channel information report may include one or more relative amplitude and phase vectors for the cells in the CoMP measurement set.

In one design, a one-shot channel feedback configuration may be supported. For this configuration, the UE may report channel information for all layers on all subbands for all cells of interest in a single report.

In one design, the UE may be configured (e.g., semi-statically) with a particular channel feedback configuration, e.g., when the UE is configured for CoMP data transmission. The UE may then report channel information in accordance with this channel feedback configuration. The channel feedback configuration for the UE may change due to various reasons such as a change in the CoMP measurement set, a change in channel conditions, a change in reporting capabilities of the UE, etc.

In another aspect, a number of channel information reporting modes may be supported. Each channel information reporting mode may allow the UE to report channel information for all or a subset of the layers, all or a subset of the subbands, and all or a subset of the cells in the CoMP measurement set. The UE can then send any amount of channel information in each report. The channel information reporting modes may also be referred to as reporting modes, channel feedback modes, etc.

In one design, one or more of the following channel information reporting modes may be supported.

Channel information reporting mode 1—a report may include channel information for one or more layers on one subband for multiple cells, Channel information reporting mode 2—a report may include channel information for one or more layers on multiple subbands for one cell, and Channel information reporting mode 3—a report may include channel information for one or more layers on multiple subbands for multiple cells.

For channel information reporting mode 1, a channel information report may include a subband index of the subband being reported. The report may include channel information for all or some cells in the CoMP measurement set. If there is a large number of cells in the CoMP measurement set, then only some of the cells may be selected for reporting, which may be referred to as cell down-selection. For each cell that is not selected for reporting, CDI and/or CMI for that cell on the subband may be determined (e.g., interpolated) from CDI and/or CMI for other subbands reported for the cell in one or more other reports.

For channel information reporting mode 2, a channel information report may include a cell index of the cell being reported. The report may include channel information for all or some subbands. If there is a large number of subbands, then only some subbands may be selected for reporting, which may be referred to as subband down-selection. For each subband that is not selected for reporting, CDI and/or CMI for the cell on that subband may be determined (e.g., interpolated) from CDI and/or CMI for other subbands reported for the cell.

For channel information reporting mode 3, a channel information report may include a subband index for each subband and a cell index for each cell being reported. The report may include channel information for all or some subbands and for all or some cells in the CoMP measurement set. If the number of cells times the number of subbands is large, then only some cells in the CoMP measurement set and/or only some subbands may be selected for reporting. Channel information reporting mode 3 may also be used to send channel information for all subbands and all cells for the one-shot channel feedback configuration.

Different and/or additional channel information reporting modes may also be supported. For example, a channel information reporting mode may support reporting of channel information for one layer on one or more subbands for one or more cells. As another example, a channel information reporting mode may support reporting of channel information for one layer on one subband for one or more cells.

In one design, the UE may report channel information with the same granularity in frequency and time for all cells in the CoMP measurement set. In another design, the UE may report channel information with different granularity in frequency and/or time for different cells in the CoMP measurement set. For example, the UE may report channel information more coarsely in frequency and/or time for weaker cells.

In general, any number of channel information reporting modes may be supported and may be used for any of the supported channel feedback configurations. In one design, the channel information reporting modes described above may be used for the single-stage and two-stage channel feedback configurations. For example, channel information reporting mode 2 may be used to send coarse channel feedback for stage 1 of the two-stage channel feedback configuration. Any one or any combination of channel information reporting modes 1, 2 and 3 may be used for the single-stage channel feedback configuration and also for stage 2 of the two-stage channel feedback configuration.

One or more channel information reporting modes may be selected for use in various manners. In one design, the UE may be configured (e.g., semi-statically) with one or more channel information reporting modes to use. In another design, the UE may be requested (e.g., dynamically by the serving cell) to use one or more channel information reporting modes. In yet another design, the UE may autonomously select a particular channel information reporting mode to use. For all designs, a channel information reporting mode may be selected based on various factors such as the number of cells in the CoMP measurement set, the number of subbands, the channel conditions observed by the UE for different cells and subbands, the reporting capabilities of the UE (e.g., the bit rate available for channel reporting), the reporting interval for channel information, etc. For example, channel information reporting mode 1 may be selected if the channel conditions for one subband (or few subbands) is better than other subbands. As another example, channel information reporting mode 2 may be selected if the channel conditions for one cell (or few cells) is better than other cells in the CoMP measurement set. As yet another example, channel information reporting mode 1 may be selected if the number of subbands is fewer than the number of cells in the CoMP measurement set, and channel information reporting mode 2 may be selected when the converse is true. This may enable the UE to send channel information for all subbands and all cells in fewer reports.

The UE may send channel information for the cells in the CoMP measurement set in various manners. In one design, the UE may periodically send channel information, e.g., as configured for the UE. In another design, the UE may send channel information when triggered by an event. For example, the UE may send channel information when requested by the serving cell, or when the UE is assigned resources to send channel information, etc. In yet another design, the UE may send some (e.g., coarse) channel information periodically and may send other (e.g., accurate) channel information aperiodically (e.g., when the UE is tentatively selected for CoMP data transmission).

The UE may send channel information using various channels. In one design, the UE may be assigned resources on a control channel to send channel information. For example, the UE may be assigned resources on a Physical Uplink Control Channel (PUCCH) in LTE, e.g., periodically every 10 ms, 20 ms, etc. The UE may then periodically send channel information on the PUCCH. In another design, the UE may be assigned resources on a data channel to send channel information. For example, the UE may be assigned resources on a Physical Uplink Shared Channel (PUSCH) in LTE. The UE may then send channel information on the PUSCH using the assigned resources. In one design, the UE may periodically send channel information on the PUCCH and/or may aperiodically send channel information on the PUSCH.

FIG. 3 shows a design of a process 300 for reporting channel information. Process 300 may be performed by a UE (as described below) or by some other entity. The UE may determine first channel information related to at least one cell among a plurality of cells in a CoMP measurement set of the UE (block 312). The first channel information may comprise rank information, CDI, CMI, relative amplitude and phase information, CQI, RQI, some other information, or a combination thereof. The first channel information may relate to a subset of the cells in the CoMP measurement set (for cell down-selection), a subset of all subbands available for communication (for subband down-selection), a subset of all layers available for communication (for layer down-selection), or a combination thereof.

The UE may determine a first channel information reporting mode to use by the UE (block 314). The first channel information reporting mode may be one of a plurality of channel information reporting modes available for reporting channel information for CoMP data transmission. The UE may send the first channel information in accordance with the first channel information reporting mode to one or more cells in the CoMP measurement set (block 316). The UE may send the first channel information on the PUSCH, the PUCCH, and/or some other channel.

In one design, the plurality of channel information reporting modes may include (i) a channel information reporting mode for reporting channel information for a single subband for multiple cells, (ii) a channel information reporting mode for reporting channel information for multiple subbands for a single cell, (iii) a channel information reporting mode for reporting channel information for multiple subbands for multiple cells, (iv) a channel information reporting mode for reporting channel information for a single layer for one or more subbands for one or more cells, (v) other channel information reporting modes, or (vi) a combination thereof.

In one design of block 314, the UE may select the first channel information reporting mode. In another design, the UE may receive a channel feedback configuration for the UE from a network entity (e.g., the serving cell or a network controller) and may determine the first channel information reporting mode based on the channel feedback configuration for the UE. The UE may also determine the first channel information reporting mode in other manners.

The UE may determine second channel information related to multiple cells in the CoMP measurement set (block 318). The UE may determine a second channel information reporting mode to use by the UE (block 320). The second channel information reporting mode may be another one of the plurality of channel information reporting modes. The UE may send the second channel information in accordance with the second channel information reporting mode to the one or more cells in the CoMP measurement set (block 322).

In one design, the first channel information reporting mode may support reporting of channel information for a single cell, and the second channel information reporting mode may support reporting of channel information for multiple cells. The single cell may be the serving cell for the UE, a strongest cell received by the UE, or a cell selected by cycling through the cells in the CoMP measurement set. In general, each channel information reporting mode may support reporting of channel information for any number of cells.

In one design, the UE may operate based on the single-stage channel feedback configuration or the one-shot channel feedback configuration and may send channel information for the cells in the CoMP measurement set in at least one reporting interval. For example, the UE may send channel information for a subset of the cells in the CoMP measurement set in each reporting interval and may cycle through the cells in the CoMP measurement set in different reporting intervals.

In another design, the UE may operate based on the two-stage channel feedback configuration. The UE may send channel information for a subset of the cells in the CoMP measurement set prior to being selected for CoMP data transmission. The UE may send channel information for all cells in the CoMP measurement set after being selected for CoMP data transmission.

The UE may also send channel information for the cells in the CoMP measurement set based on other channel feedback configurations. In one design, the UE may periodically send channel information for some or all cells in the CoMP measurement set in each of a plurality of reporting intervals. In another design, the UE may send channel information for some or all cells in the CoMP measurement set when triggered, e.g., when selected for CoMP data transmission.

In one design of block 312, the UE may determine at least one channel matrix $H_m(k)$ for the at least one cell and may determine CDI for the at least one cell based on the at least one channel matrix. In one design, the UE may quantize channel vectors in the at least one channel matrix. In another design, the UE may determine at least one equivalent channel matrix $G_m(k)$ for the at least one cell and may determine the CDI based on the at least one equivalent channel matrix. For example, the UE may decompose a channel matrix $H_1(k)$ for a designated cell to obtain a receive matrix $U_1(k)$ and may determine the at least one equivalent channel matrix based on the at least one channel matrix and the receive matrix, e.g., as shown in equation (3). The designated cell may be one of the cells in the CoMP measurement set, e.g., may be the serving cell or the strongest cell received by the UE. In yet another design, the UE may determine a covariance matrix $R(k)$ of residual interference at the UE, determine at least one whitened channel matrix $W_m(k)$ based on the at least one channel matrix and the covariance matrix, e.g., as shown in equation (7), and determine the CDI based on the at least one whitened channel matrix. In one design, the UE may determine at least one quantized channel vector $d_{n,m}(k)$ based on the at least one channel matrix, or the at least one equivalent channel matrix, or the at least one whitened channel matrix, etc. The UE may then determine the CDI for the at least one cell based on the at least one quantized channel vector. The UE may also determine the CDI in other manners. The UE may generate the first channel information comprising the CDI for the at least one cell.

In one design, the UE may determine CMI for the at least one cell based on the at least one channel matrix, or at least one channel gain, and/or other information for the at least one cell. The UE may generate the first channel information further comprising the CMI for the at least one cell.

The UE may generate and send a report in step 316. In one design, the report may comprise an index of a subband and the first channel information, which may be for the at least one cell on the subband. In another design, the report may comprise an index of a single cell and the first channel information, which may be for the cell on a plurality of subbands. In yet another design, the report may comprise multiple subband indices for multiple subbands and multiple cell indices for multiple cells and the first channel information, which may be for the multiple cells on the multiple subbands. In general, the report may include any number and any type of indices, and the first channel information may be related to any number of subbands, cells, and layers.

FIG. 4 shows a design of a process 400 for receiving channel information. Process 400 may be performed by a cell (as described below) or by some other entity. The cell may determine a first channel information reporting mode for a UE to report channel information for a plurality of cells in a CoMP measurement set of the UE (block 412). The first channel information reporting mode may be one of a plurality of channel information reporting modes available for reporting channel information for CoMP data transmission. The cell may be one of the cells in the CoMP measurement set of the UE. The cell may receive first channel information sent by the UE (e.g., on the PDSCH and/or the PUCCH) in accordance with the first channel information reporting mode (block 414). The first channel information may be related to at least one cell in the CoMP measurement set of the UE.

The cell may obtain rank information, CDI, CMI, relative amplitude and phase information, CQI, RQI, or a combination thereof, for the at least one cell from the first channel information. In one design, the cell may receive a plurality of reports sent by the UE in a plurality of reporting intervals. The cell may obtain channel information for a subset of the cells in the CoMP measurement set from each report. The cell may aggregate the channel information obtained from each of the reports to determine overall channel information for the cells in the CoMP measurement set.

In one design, the cell may determine a second channel information reporting mode for the UE to report channel information (block 416). The second channel information reporting mode may be another one of the plurality of channel information reporting modes. The cell may receive second channel information sent by the UE in accordance with the second channel information reporting mode. The second channel information may be for multiple cells in the CoMP measurement set. In one design, the first channel information reporting mode may support reporting of channel information for a single cell, and the second channel information reporting mode may support reporting of channel information for multiple cells. In general, each channel information reporting mode may support reporting of channel information for any number of cells.

In one design, the UE may operate based on the single-stage channel feedback configuration or the one-shot channel feedback configuration. The cell may receive channel information for the cells in the CoMP measurement set in at least one reporting interval. In another design, the UE may operate based on the two-stage channel feedback configuration. The cell may receive channel information for a subset of the cells in the CoMP measurement set, select the UE for CoMP data transmission, and receive channel information for all cells in the CoMP measurement set after selecting the UE for CoMP data transmission.

In one design, the cell may receive, from first UEs, channel information for a subset of the cells in the CoMP measurement sets of the first UEs. The cell may receive, from second UEs, channel information for all cells in the CoMP measurement sets of the second UEs. The first UEs may include UEs that are selectable for CoMP data transmission. The second UEs may include UEs that are selected for CoMP data transmission.

The UE may also operate based on some other channel feedback configuration. In one design, the cell may receive channel information sent periodically in each of a plurality of reporting intervals by the UE. The cell may also receive channel information sent by the UE when triggered, e.g., when directed by the cell.

In one design, the cell may obtain at least one channel vector based on the first and/or second channel information received from the UE. The cell may determine at least one precoding vector for the UE based on the at least one channel vector. The cell may then send data to the UE based on the at least one precoding vector. One or more other cells in the CoMP measurement set may cooperate to send data to the UE.

Figure 5:
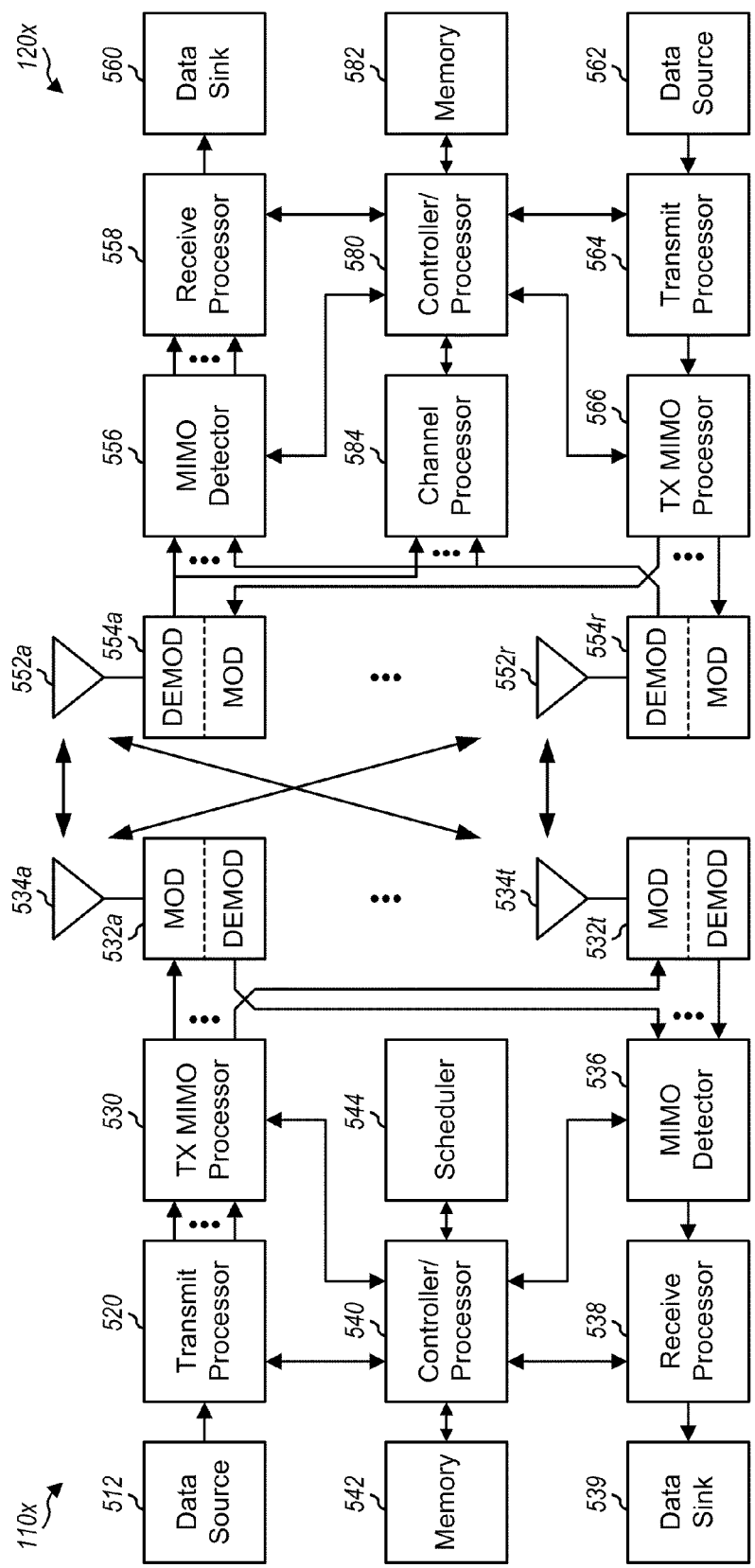
FIGS. 5 and 6 show block diagrams of two designs of a base station and a UE.

FIG. 5 shows a block diagram of a design of a base station/eNB 110*x* and a UE 120*x*, which may be one of the base stations/eNBs and one of the UEs in FIG. 1. Base station 110*x* may serve one or more cells and may be equipped with T antennas 534*a* through 534*t*, where in general T≥1. UE 120*x* may be equipped with R antennas 552*a* through 552*r*, where in general R≥1.

At base station 110*x*, a transmit processor 520 may receive data from a data source 512 for one or more UEs scheduled for data transmission with and/or without CoMP, process (e.g., encode and modulate) the data for each scheduled UE based on one or more modulation and coding schemes selected for that UE, and provide data symbols for all UEs. Transmit processor 520 may also process control information (e.g., for scheduling grants, configuration messages, etc.) and provide control symbols. Processor 520 may also generate reference symbols for reference signals. A transmit (TX) MIMO processor 530 may precode the data symbols, the control symbols, and/or the reference symbols (if applicable) and may provide T output symbol streams to T modulators (MOD) 532*a* through 532*t*. Each modulator 532 may process its output symbol stream (e.g., for OFDM, etc.) to obtain an output sample stream. Each modulator 532 may further condition (e.g., convert to analog, amplify, filter, and upconvert) its output sample stream to obtain a downlink signal. T downlink signals from modulators 532*a* through 532*t* may be transmitted via T antennas 534*a* through 534*t*, respectively.

At UE 120*x*, antennas 552*a* through 552*r* may receive the downlink signals from base station 110*x* and/or other base stations and may provide received signals to demodulators (DEMODs) 554*a* through 554*r*, respectively. Each demodulator 554 may condition (e.g., filter, amplify, downconvert, and digitize) its received signal to obtain input samples. Each demodulator 554 may further process the input samples (e.g., for OFDM, etc.) to obtain received symbols. A channel processor 584 may derive a channel estimate for each cell of interest based on one or more reference signals transmitted by that cell. A MIMO detector 556 may obtain received symbols from all R demodulators 554*a* through 554*r*, perform MIMO detection on the received symbols based on the channel estimates for all cells transmitting to the UE, and provide detected symbols. A receive processor 558 may process (e.g., demodulate and decode) the detected symbols, provide decoded data for UE 120*x* to a data sink 560, and provide decoded control information to a controller/processor 580.

On the uplink, at UE 120*x*, a transmit processor 564 may receive and process data from a data source 562 and control information and channel information from controller/processor 580. Processor 564 may also generate reference symbols for one or more reference signals. The symbols from transmit processor 564 may be precoded by a TX MIMO processor 566 if applicable, further processed by modulators 554*a* through 554*r* (e.g., for SC-FDM, OFDM, etc.), and transmitted to base station 110*x*. At base station 110*x*, the uplink signals from UE 120*x* and other UEs may be received by antennas 534, processed by demodulators 532, detected by a MIMO detector 536 if applicable, and further processed by a receive processor 538 to obtain decoded data, control information, and channel information sent by UE 120*x* and other UEs. Processor 538 may provide the decoded data to a data sink 539 and the decoded control information and channel information to controller/processor 540.

Controllers/processors 540 and 580 may direct the operation at base station 110*x* and UE 120*x*, respectively. Processor 540 and/or other processors and modules at base station 110*x* may perform or direct process 400 in FIG. 4 and/or other processes for the techniques described herein. Processor 580 and/or other processors and modules at UE 120*x* may perform or direct process 300 in FIG. 3 and/or other processes for the techniques described herein. Memories 542 and 582 may store data and program codes for base station 110*x* and UE 120*x*, respectively. A scheduler 544 may schedule UEs for data transmission on the downlink and/or uplink.

Figure 6:
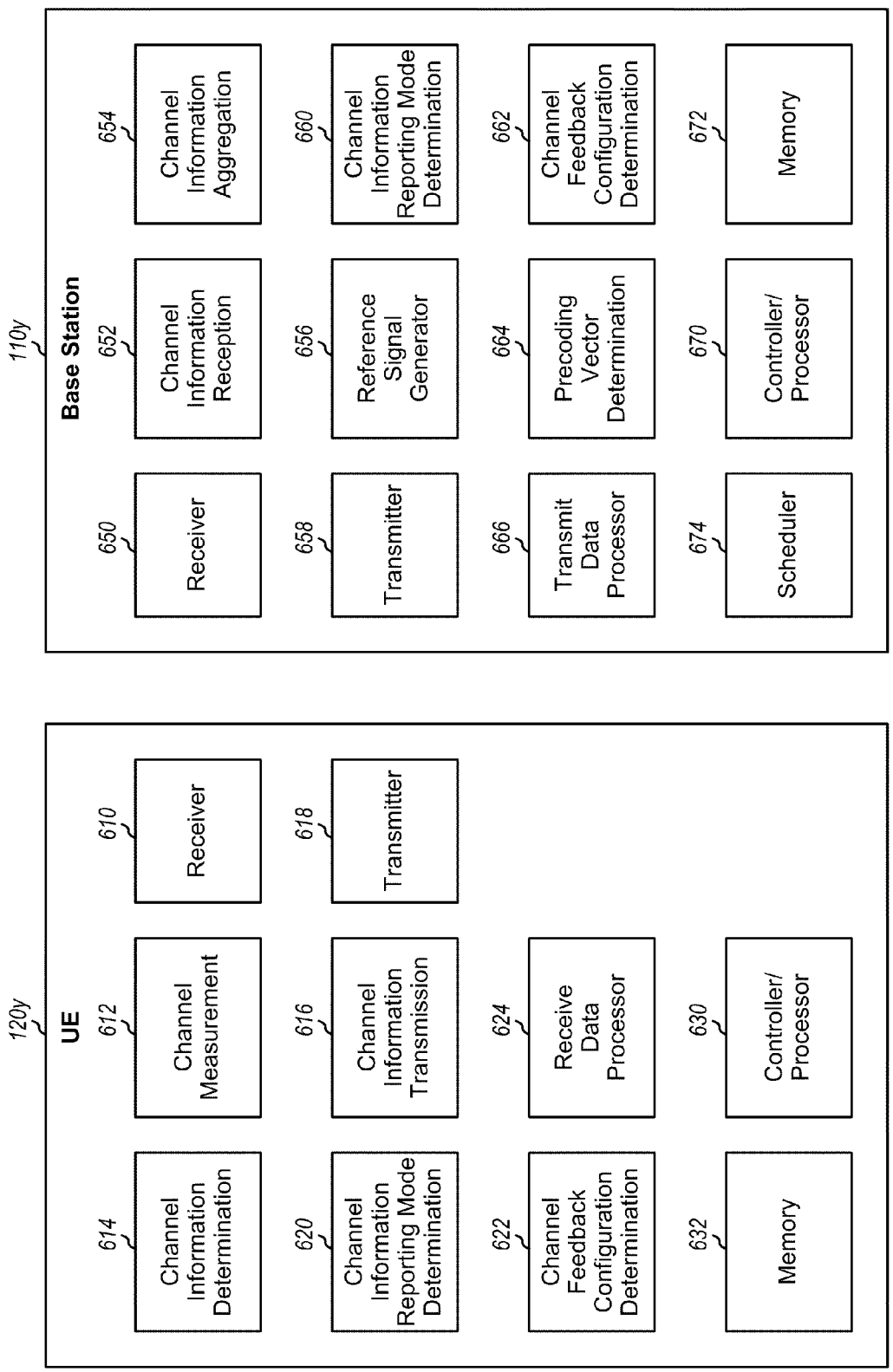

FIG. 6 shows a block diagram of a design of a UE 120*y* that can send channel information and a base station 110*y* that can receive channel information. Within UE 120*y*, a receiver 610 may receive signals transmitted by base stations and other possibly other stations. A module 612 may estimate the channel response for each cell of interest (e.g., for cells in a CoMP measurement set of UE 120y) and may provide channel estimates (e.g., channel matrices, channel gains, etc.). A module 614 may determine channel information (e.g., CDI, CMI, etc.) for cells of interest based on the channel estimates, e.g., based on any of the hierarchical eigen-feedback designs described above. A module 616 may be responsible for transmission of channel information. Module 616 may generate channel information reports based on a selected channel information reporting mode and a selected channel information configuration for UE 120y. Module 616 may also send the reports on one or more channels (e.g., on the PUCCH and/or PUSCH) at the appropriate time to one or more cells (e.g., the serving cell). A transmitter 618 may transmit the reports generated by module 616.

A module 620 may determine the channel information reporting mode selected for UE 120y from among all supported channel information reporting modes. A module 622 may determine the channel feedback configuration selected for UE 120y from among all supported channel feedback configurations. A module 624 may process a CoMP data transmission sent to UE 120y. The various modules within UE 120y may operate as described above. A controller/processor 630 may direct the operation of various modules within UE 120y. A memory 632 may store data and program codes for UE 120y.

Within base station 110y, a receiver 650 may receive signals transmitted by UE 120y and other UEs. A module 652 may receive channel information sent by UEs that can be scheduled for data transmission. A module 654 may aggregate channel information received in different reports from each UE. A module 660 may determine the channel information reporting mode selected for each UE. A module 662 may determine the channel feedback configuration selected for each UE. Modules 652 and 654 may operate based on the channel information reporting mode and the channel feedback configuration selected for each UE. A reference signal generator 656 may generate reference signals used for channel estimation by the UEs. A transmitter 658 may transmit the reference signals and other signals to the UEs.

A scheduler 674 may tentatively select UEs for CoMP data transmission and may schedule UEs for CoMP data transmission. A module 664 may compute precoding vectors for each scheduled UE based on channel information received from the UE. A module 666 may process data for CoMP data transmission to each scheduled UE. The various modules within base station 110y may operate as described above. A controller/processor 670 may direct the operation of various modules within base station 110y. A memory 672 may store data and program codes for base station 110y.

In one configuration, an apparatus (e.g., apparatus 120x) for wireless communication may include means for determining at a UE first channel information related to at least one cell among a plurality of cells in a CoMP measurement set of the UE, means for determining a first channel information reporting mode to use by the UE, means for sending the first channel information in accordance with the first channel information reporting mode to one or more cells in the CoMP measurement set, means for determining second channel information related to multiple cells in the CoMP measurement set, means for determining a second channel information reporting mode to use by the UE, and means for sending the second channel information in accordance with the second channel information reporting mode to the one or more cells. The first and second channel information reporting modes may be two of a plurality of channel information reporting modes available for reporting channel information for CoMP data transmission.

In one configuration, an apparatus (e.g., apparatus 110x) for wireless communication may include means for determining a first channel information reporting mode for a UE to report channel information for a plurality of cells in a CoMP measurement set of the UE, means for receiving first channel information from the UE in accordance with the first channel information reporting mode, means for determining a second channel information reporting mode for the UE to report channel information, and means for receiving second channel information from the UE in accordance with the second channel information reporting mode. The first channel information may be related to at least one cell in the CoMP measurement set, and the second channel information may be related to multiple cells in the CoMP measurement set. The first and second channel information reporting modes may be two of a plurality of channel information reporting modes available for reporting channel information for CoMP data transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining at a user equipment (UE) first channel information related to at least one cell among a plurality of cells in a coordinated multi-point (CoMP) measurement set of the UE;
   determining a first channel information reporting mode for use by the UE, the first channel information reporting mode being one of a plurality of channel information reporting modes available for reporting channel information for CoMP data transmission; and
   sending the first channel information in accordance with the first channel information reporting mode to one or more cells in the CoMP measurement set.

2. The method of claim 1, wherein the determining the first channel information comprises determining rank information, channel direction information (CDI), channel magnitude information (CMI), relative amplitude and phase information, channel quality information (CQI), resource quality information (RQI), or a combination thereof.

3. The method of claim 1, wherein the plurality of channel information reporting modes comprises:
   a channel information reporting mode for reporting channel information for a single subband for multiple cells,
   a channel information reporting mode for reporting channel information for a plurality of subbands for a single cell,
   a channel information reporting mode for reporting channel information for multiple subbands for multiple cells,
   a channel information reporting mode for reporting channel information for a single layer for one or more subbands for one or more cells,
   or a combination thereof.

4. The method of claim 1, wherein the determining the first channel information reporting mode comprises selecting the first channel information reporting mode at the UE.

5. The method of claim 1, wherein the determining the first channel information reporting mode comprises:
   receiving a channel feedback configuration for the UE from a network entity, and
   determining the first channel information reporting mode based on the channel feedback configuration for the UE.

6. The method of claim 1, wherein the determining the first channel information comprises:
   selecting at the UE a subset of a plurality of subbands available for transmission, and
   determining the first channel information for the selected subset of the plurality of subbands.

7. The method of claim 1, wherein the determining the first channel information comprises:
   selecting at the UE a subset of a plurality of cells in the CoMP measurement set, and
   determining the first channel information for the selected subset of the plurality of cells.

8. The method of claim 1, wherein the determining the first channel information comprises determining the first channel information for a subset of the cells in the CoMP measurement set, a subset of all subbands available for communication, a subset of all layers available for communication, or a combination thereof.

9. The method of claim 1, further comprising:
   determining second channel information related to multiple cells in the CoMP measurement set;
   determining a second channel information reporting mode to use by the UE, the second channel information reporting mode being another one of the plurality of channel information reporting modes; and
   sending the second channel information in accordance with the second channel information reporting mode to the one or more cells in the CoMP measurement set.

10. The method of claim 9, further comprising:
    switching from the first channel information reporting mode to the second channel information reporting mode in response to a message received from a network entity or based on channel conditions.

11. The method of claim 9, wherein the first channel information reporting mode supports reporting of channel information for a single cell, and wherein the second channel information reporting mode supports reporting of channel information for multiple cells.

12. The method of claim 11, wherein the single cell comprises a serving cell for the UE, or a strongest cell received by the UE, or a cell selected by cycling through the plurality of cells in the CoMP measurement set.

13. The method of claim 1, further comprising:
sending channel information for the plurality of cells in the CoMP measurement set in at least one reporting interval.

14. The method of claim 1, further comprising:
sending channel information for a subset of the plurality of cells in the CoMP measurement set prior to the UE being selected for CoMP data transmission; and
sending channel information for all of the plurality of cells in the CoMP measurement set after the UE is selected for CoMP data transmission.

15. The method of claim 1, wherein the sending the first channel information comprises sending the first channel information on a Physical Uplink Shared Channel (PUSCH), or a Physical Uplink Control Channel (PUCCH), or both.

16. The method of claim 1, further comprising:
periodically sending channel information for all or a subset of the plurality of cells in the CoMP measurement set in each of a plurality of reporting intervals.

17. The method of claim 1, further comprising:
sending channel information for all or a subset of the plurality of cells in the CoMP measurement set when triggered.

18. The method of claim 1, further comprising:
determining at least one channel matrix for the at least one cell;
determining channel direction information (CDI) for the at least one cell based on the at least one channel matrix; and
generating the first channel information comprising the CDI for the at least one cell.

19. The method of claim 18, wherein the determining the CDI for the at least one cell comprises
decomposing a channel matrix for a designated cell to obtain a receive matrix, the designated cell being one of the plurality of cells in the CoMP measurement set,
determining at least one equivalent channel matrix based on the at least one channel matrix and the receive matrix, and
determining the CDI for the at least one cell based on the at least one equivalent channel matrix.

20. The method of claim 18, wherein the determining the CDI for the at least one cell comprises
determining a covariance matrix of residual interference at the UE,
determining at least one whitened channel matrix based on the at least one channel matrix and the covariance matrix, and
determining the CDI for the at least one cell based on the at least one whitened channel matrix.

21. The method of claim 18, further comprising:
determining channel magnitude information (CMI) for the at least one cell based on the at least one channel matrix; and
generating the first channel information further comprising the CMI for the at least one cell.

22. An apparatus for wireless communication, comprising:
means for determining at a user equipment (UE) first channel information related to at least one cell among a plurality of cells in a coordinated multi-point (CoMP) measurement set of the UE;
means for determining a first channel information reporting mode for use by the UE, the first channel information reporting mode being one of a plurality of channel information reporting modes available for reporting channel information for CoMP data transmission; and
means for sending the first channel information in accordance with the first channel information reporting mode to one or more cells in the CoMP measurement set.

23. The apparatus of claim 22, further comprising:
means for determining second channel information related to multiple cells in the CoMP measurement set;
means for determining a second channel information reporting mode to use by the UE, the second channel information reporting mode being another one of the plurality of channel information reporting modes; and
means for sending the second channel information in accordance with the second channel information reporting mode to the one or more cells in the CoMP measurement set.

24. The apparatus of claim 22, further comprising:
means for sending channel information for the plurality of cells in the CoMP measurement set in at least one reporting interval.

25. The apparatus of claim 22, further comprising:
means for sending channel information for a subset of the plurality of cells in the CoMP measurement set prior to the UE being selected for CoMP data transmission; and
means for sending channel information for all of the plurality of cells in the CoMP measurement set after the UE is selected for CoMP data transmission.

26. The apparatus of claim 22, further comprising:
means for determining at least one channel matrix for the at least one cell;
means for determining channel direction information (CDI) for the at least one cell based on the at least one channel matrix; and
means for generating the first channel information comprising the CDI for the at least one cell.

27. The apparatus of claim 26, further comprising:
means for determining channel magnitude information (CMI) for the at least one cell based on the at least one channel matrix; and
means for generating the first channel information further comprising the CMI for the at least one cell.

28. An apparatus for wireless communication, comprising:
at least one processor configured to:
determine at a user equipment (UE) first channel information related to at least one cell among a plurality of cells in a coordinated multi-point (CoMP) measurement set of the UE,
determine a first channel information reporting mode for use by the UE, the first channel information reporting mode being one of a plurality of channel information reporting modes available for reporting channel information for CoMP data transmission, and
send the first channel information in accordance with the first channel information reporting mode to one or more cells in the CoMP measurement set.

29. The apparatus of claim 28, wherein the at least one processor is configured to:
determine second channel information related to multiple cells in the CoMP measurement set,
determine a second channel information reporting mode to use by the UE, the second channel information reporting mode being another one of the plurality of channel information reporting modes, and
send the second channel information in accordance with the second channel information reporting mode to the one or more cells in the CoMP measurement set.

30. The apparatus of claim 28, wherein the at least one processor is configured to send channel information for the plurality of cells in the CoMP measurement set in at least one reporting interval.

31. The apparatus of claim 28, wherein the at least one processor is configured to:
send channel information for a subset of the plurality of cells in the CoMP measurement set prior to the UE being selected for CoMP data transmission, and
send channel information for all of the plurality of cells in the CoMP measurement set after the UE is selected for CoMP data transmission.

32. The apparatus of claim 28, wherein the at least one processor is configured to:
determine at least one channel matrix for the at least one cell,
determine channel direction information (CDI) for the at least one cell based on the at least one channel matrix, and
generate the first channel information comprising the CDI for the at least one cell.

33. The apparatus of claim 32, wherein the at least one processor is configured to determine channel magnitude information (CMI) for the at least one cell based on the at least one channel matrix, and to generate the first channel information further comprising the CMI for the at least one cell.

34. A computer program product, comprising:
a non-transitory computer-readable medium comprising:
code for causing at least one computer to determine at a user equipment (UE) first channel information related to at least one cell among a plurality of cells in a coordinated multi-point (CoMP) measurement set of the UE,
code for causing the at least one computer to determine a first channel information reporting mode for use by the UE, the first channel information reporting mode being one of a plurality of channel information reporting modes available for reporting channel information for CoMP data transmission, and
code for causing the at least one computer to send the first channel information in accordance with the first channel information reporting mode to one or more cells in the CoMP measurement set.

35. A method for wireless communication, comprising:
determining a first channel information reporting mode for a user equipment (UE) to report channel information for a plurality of cells in a coordinated multi-point (CoMP) measurement set of the UE, the first channel information reporting mode being one of a plurality of channel information reporting modes available for reporting channel information for CoMP data transmission; and
receiving first channel information from the UE in accordance with the first channel information reporting mode, the first channel information being related to at least one cell among the plurality of cells in the CoMP measurement set.

36. The method of claim 35, further comprising:
obtaining rank information, channel direction information (CDI), channel magnitude information (CMI), relative amplitude and phase information, channel quality information (CQI), resource quality information (RQI), or a combination thereof, for the at least one cell from the first channel information.

37. The method of claim 35, wherein the plurality of channel information reporting modes includes:
a channel information reporting mode for reporting channel information for a single subband for multiple cells,
a channel information reporting mode for reporting channel information for a plurality of subbands for a single cell,
a channel information reporting mode for reporting channel information for multiple subbands for multiple cells,
a channel information reporting mode for reporting channel information for a single layer for one or more subbands for one or more cells,
or a combination thereof.

38. The method of claim 35, wherein the first channel information relates to:
a subset of the cells in the CoMP measurement set,
a subset of all subbands available for communication, a subset of all layers available for communication,
or a combination thereof.

39. The method of claim 35, further comprising:
receiving a plurality of reports sent by the UE in a plurality of reporting intervals;
obtaining channel information for a subset of the plurality of cells in the CoMP measurement set from each of the plurality of reports; and
aggregating the channel information obtained from each of the plurality of reports to determine overall channel information for the plurality of cells in the CoMP measurement set.

40. The method of claim 35, further comprising:
determining a second channel information reporting mode for the UE to report channel information, the second channel information reporting mode being another one of the plurality of channel information reporting modes; and
receiving second channel information from the UE in accordance with the second channel information reporting mode, the second channel information being related to multiple cells in the CoMP measurement set.

41. The method of claim 40, wherein the first channel information reporting mode supports reporting of channel information for a single cell, and wherein the second channel information reporting mode supports reporting of channel information for multiple cells.

42. The method of claim 35, further comprising:
receiving channel information for the plurality of cells in the CoMP measurement set in at least one reporting interval.

43. The method of claim 35, further comprising:
receiving channel information for a subset of the plurality of cells in the CoMP measurement set;
selecting the UE for CoMP data transmission; and
receiving channel information for all of the plurality of cells in the CoMP measurement set after selecting the UE for CoMP data transmission.

44. The method of claim 35, further comprising:
receiving from first UEs channel information for a subset of cells in CoMP measurement sets of the first UEs, the first UEs being candidates selectable for CoMP data transmission; and
receiving from second UEs channel information for all cells in CoMP measurement sets of the second UEs, the second UEs being selected for CoMP data transmission.

45. The method of claim 35, wherein the receiving the first channel information comprises receiving the first channel information on a Physical Uplink Shared Channel (PUSCH), or a Physical Uplink Control Channel (PUCCH), or both.

46. The method of claim 35, further comprising:
receiving channel information sent periodically in each of a plurality of reporting intervals by the UE or sent by the UE when triggered.

47. The method of claim 35, further comprising:
obtaining at least one channel vector based on the first channel information;
determining at least one precoding vector for the UE based on the at least one channel vector; and
sending data to the UE based on the at least one precoding vector.

48. An apparatus for wireless communication, comprising:
means for determining a first channel information reporting mode for a user equipment (UE) to report channel information for a plurality of cells in a coordinated multi-point (CoMP) measurement set of the UE, the first channel information reporting mode being one of a plurality of channel information reporting modes available for reporting channel information for CoMP data transmission; and
means for receiving first channel information from the UE in accordance with the first channel information reporting mode, the first channel information being related to at least one cell among the plurality of cells in the CoMP measurement set.

49. The apparatus of claim 48, further comprising:
means for receiving a plurality of reports sent by the UE in a plurality of reporting intervals;
means for obtaining channel information for a subset of the plurality of cells in the CoMP measurement set from each of the plurality of reports; and
means for aggregating the channel information obtained from each of the plurality of reports to determine overall channel information for the plurality of cells in the CoMP measurement set.

50. The apparatus of claim 48, further comprising:
means for determining a second channel information reporting mode for the UE to report channel information, the second channel information reporting mode being another one of the plurality of channel information reporting modes; and
means for receiving second channel information from the UE in accordance with the second channel information reporting mode, the second channel information being related to multiple cells in the CoMP measurement set.

51. The apparatus of claim 48, further comprising:
means for receiving channel information for the plurality of cells in the CoMP measurement set in at least one reporting interval.

52. The apparatus of claim 48, further comprising:
means for receiving channel information for a subset of the plurality of cells in the CoMP measurement set;
means for selecting the UE for CoMP data transmission; and
means for receiving channel information for all of the plurality of cells in the CoMP measurement set after selecting the UE for CoMP data transmission.

53. The apparatus of claim 48, further comprising:
means for receiving from first UEs channel information for a subset of cells in CoMP measurement sets of the first UEs, the first UEs being candidates selectable for CoMP data transmission; and
means for receiving from second UEs channel information for all cells in CoMP measurement sets of the second UEs, the second UEs being selected for CoMP data transmission.

54. The apparatus of claim 48, further comprising:
means for obtaining at least one channel vector based on the first channel information;
means for determining at least one precoding vector for the UE based on the at least one channel vector; and
means for sending data to the UE based on the at least one precoding vector.

55. An apparatus for wireless communication, comprising:
at least one processor configured to:
determine a first channel information reporting mode for a user equipment (UE) to report channel information for a plurality of cells in a coordinated multi-point (CoMP) measurement set of the UE, the first channel information reporting mode being one of a plurality of channel information reporting modes available for reporting channel information for CoMP data transmission, and
receive first channel information from the UE in accordance with the first channel information reporting mode, the first channel information being related to at least one cell among the plurality of cells in the CoMP measurement set.

56. The apparatus of claim 55, wherein the at least one processor is configured to:
receive a plurality of reports sent by the UE in a plurality of reporting intervals, to obtain channel information for a subset of the plurality of cells in the CoMP measurement set from each of the plurality of reports, and
aggregate the channel information obtained from each of the plurality of reports to determine overall channel information for the plurality of cells in the CoMP measurement set.

57. The apparatus of claim 55, wherein the at least one processor is configured to:
determine a second channel information reporting mode for the UE to report channel information, the second channel information reporting mode being another one of the plurality of channel information reporting modes, and
receive second channel information from the UE in accordance with the second channel information reporting mode, the second channel information being related to multiple cells in the CoMP measurement set.

58. The apparatus of claim 55, wherein the at least one processor is configured to receive channel information for the plurality of cells in the CoMP measurement set in at least one reporting interval.

59. The apparatus of claim 55, wherein the at least one processor is configured to:
receive channel information for a subset of the plurality of cells in the CoMP measurement set, to select the UE for CoMP data transmission, and
receive channel information for all of the plurality of cells in the CoMP measurement set after selecting the UE for CoMP data transmission.

60. The apparatus of claim 55, wherein the at least one processor is configured to:
receive from first UEs channel information for a subset of cells in CoMP measurement sets of the first UEs, the first UEs being candidates selectable for CoMP data transmission, and
receive from second UEs channel information for all cells in CoMP measurement sets of the second UEs, the second UEs being selected for CoMP data transmission.

61. The apparatus of claim 55, wherein the at least one processor is configured to:
obtain at least one channel vector based on the first channel information, to determine at least one precoding vector for the UE based on the at least one channel vector, and
send data to the UE based on the at least one precoding vector.

62. A computer program product, comprising:
a non-transitory computer-readable medium comprising:
- code for causing at least one computer to determine a first channel information reporting mode for a user equipment (UE) to report channel information for a plurality of cells in a coordinated multi-point (CoMP) measurement set of the UE, the first channel information reporting mode being one of a plurality of channel information reporting modes available for reporting channel information for CoMP data transmission, and
- code for causing the at least one computer to receive first channel information from the UE in accordance with the first channel information reporting mode, the first channel information being related to at least one cell among the plurality of cells in the CoMP measurement set.

* * * * *